(12) United States Patent
Kim et al.

(10) Patent No.: US 11,498,050 B2
(45) Date of Patent: Nov. 15, 2022

(54) METHOD OF PREPARING SUPERABSORBENT POLYMER

(71) Applicant: LG Chem, Ltd., Seoul (KR)

(72) Inventors: Kyu Pal Kim, Daejeon (KR); Jinuk Choi, Daejeon (KR); Sang Hwa Lee, Daejeon (KR); Gicheul Kim, Daejeon (KR); Ki Hyun Kim, Daejeon (KR); Seul Ah Lee, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/966,338

(22) PCT Filed: Nov. 15, 2019

(86) PCT No.: PCT/KR2019/015681
§ 371 (c)(1),
(2) Date: Jul. 30, 2020

(87) PCT Pub. No.: WO2020/122442
PCT Pub. Date: Jun. 18, 2020

(65) Prior Publication Data
US 2020/0368722 A1 Nov. 26, 2020

(30) Foreign Application Priority Data

Dec. 13, 2018 (KR) .................... 10-2018-0161293

(51) Int. Cl.
| | |
|---|---|
| *B01J 20/26* | (2006.01) |
| *B01J 20/10* | (2006.01) |
| *B01J 20/28* | (2006.01) |
| *B01J 20/30* | (2006.01) |

(52) U.S. Cl.
CPC .......... *B01J 20/267* (2013.01); *B01J 20/103* (2013.01); *B01J 20/28004* (2013.01); *B01J 20/28016* (2013.01); *B01J 20/3007* (2013.01); *B01J 20/3085* (2013.01)

(58) Field of Classification Search
None
See application file for complete search history.

(56) References Cited

U.S. PATENT DOCUMENTS

| | | | |
|---|---|---|---|
| 2005/0137546 A1 | 6/2005 | Joy et al. | |
| 2005/0245393 A1* | 11/2005 | Herfert ................ | C08K 3/346 502/402 |
| 2008/0075937 A1 | 3/2008 | Wada et al. | |
| 2008/0140037 A1 | 6/2008 | Newman | |
| 2009/0191408 A1 | 7/2009 | Tian et al. | |
| 2012/0001122 A1 | 1/2012 | Wattebled et al. | |
| 2014/0114035 A1 | 4/2014 | Nogi et al. | |
| 2015/0315321 A1 | 11/2015 | Won et al. | |
| 2016/0096944 A1 | 4/2016 | Wattebled et al. | |
| 2018/0244868 A1 | 8/2018 | Lee et al. | |
| 2018/0298132 A1* | 10/2018 | Yorino ................ | C08J 3/24 |
| 2019/0010297 A1 | 1/2019 | Lee et al. | |
| 2019/0071523 A1 | 3/2019 | Kim et al. | |
| 2019/0085103 A1 | 3/2019 | Kim et al. | |
| 2019/0091656 A1 | 3/2019 | Kim et al. | |
| 2019/0126240 A1 | 5/2019 | Yoon et al. | |
| 2020/0164344 A1 | 5/2020 | Kim et al. | |
| 2021/0094017 A1* | 4/2021 | Choi ................ | C08K 9/10 |

FOREIGN PATENT DOCUMENTS

| | | |
|---|---|---|
| CN | 108779262 A | 11/2018 |
| CN | 108779264 A | 11/2018 |
| CN | 108779265 A | 11/2018 |
| EP | 3290447 A1 | 3/2018 |
| EP | 3 406 655 A1 * | 11/2018 |
| EP | 3406655 A1 | 11/2018 |
| JP | 3439230 B2 | 8/2003 |
| JP | 2007514833 A | 6/2007 |

(Continued)

OTHER PUBLICATIONS

European Search Report for Application No. EP19895564, dated Dec. 21, 2020, 6 pages.

(Continued)

*Primary Examiner* — Joseph D Anthony
(74) *Attorney, Agent, or Firm* — Lerner, David, Littenberg, Krumholz & Mentlik, LLP

(57) ABSTRACT

A method of preparing a superabsorbent polymer, which enables the preparation of the superabsorbent polymer exhibiting an improved absorption rate while maintaining excellent absorption performances is provided. The method of preparing the superabsorbent polymer includes carrying out a crosslinking polymerization of a water-soluble ethylene-based unsaturated monomer having acidic groups which are at least partially neutralized, in the presence of an internal crosslinking agent having a predetermined chemical structure to form a water-containing gel polymer, gel-pulverizing the water-containing gel polymer, drying, pulverizing, and size-sorting the gel-pulverized water-containing gel polymer to form a base polymer powder, and carrying out a surface crosslinking of the base polymer powder by a heat treatment in the presence of a surface crosslinking agent, wherein the gel-pulverizing is carried out by extruding the water-containing gel polymer through a porous plate having a plurality of holes using a screw extruder mounted inside a cylindrical pulverizer under a condition that a chopping index is 28 (/s) or more.

13 Claims, No Drawings

(56) References Cited

FOREIGN PATENT DOCUMENTS

| | | |
|---|---|---|
| JP | 2008522003 A | 6/2008 |
| JP | 5635685 B2 | 12/2014 |
| KR | 20120043165 A | 5/2012 |
| KR | 101358296 B1 | 2/2014 |
| KR | 20160010516 A | 1/2016 |
| KR | 20160056326 A | 5/2016 |
| KR | 20170011253 A | 2/2017 |
| KR | 20180043143 A | 4/2018 |
| KR | 20180043713 A | 4/2018 |
| KR | 20180050145 A | 5/2018 |
| KR | 20180071851 A | 6/2018 |
| KR | 20180087049 A | 8/2018 |
| KR | 20180100871 A | 9/2018 |
| WO | 2006062609 A2 | 6/2006 |
| WO | 2014178588 A1 | 11/2014 |
| WO | 2018139768 A1 | 8/2018 |

OTHER PUBLICATIONS

International Search Report for Application No. PCT/KR2019/015681 dated Mar. 27, 2020, 3 pages.
Odian, Principles of Polymerization, Second Edition, Copyright 1981 by John Wiley & Sons, Inc, p. 203.
Schwalm, UV Coatings; Basics, Recent Developments and New Applications, Dec. 21, 2006, p. 115, Elsevier Science.
Search Report dated Sep. 23, 2022 from the Office Action for Chinese Application No. 201980009343.5 issued Sep. 30, 2022, 3 pages [See p. 2, categorizing the cited references].

\* cited by examiner

METHOD OF PREPARING SUPERABSORBENT POLYMER

CROSS-REFERENCE TO RELATED APPLICATIONS

The present application is a national phase entry under 35 U.S.C. § 371 of International Application No. PCT/KR2019/015681, filed Nov. 15, 2019, which claims priority to Korean Patent Application No. 10-2018-0161293, filed Dec. 13, 2018, the disclosures of which are incorporated by reference herein.

TECHNICAL FIELD

The present invention relates to a method of preparing a superabsorbent polymer, which enables the preparation of the superabsorbent polymer exhibiting an improved absorption rate while maintaining excellent absorption performances.

BACKGROUND ART

A superabsorbent polymer (SAP) is a synthetic polymeric material capable of absorbing moisture from about 500 to 1000 times its own weight, and also called SAM (Super Absorbency Material), AGM (Absorbent Gel Material), etc.

Since superabsorbent polymers started to be practically applied in sanitary products, now they have been widely used not only for hygiene products such as disposable diapers for children, etc., but also for water retaining soil products for gardening, water stop materials for the civil engineering and construction, sheets for raising seedling, fresh-keeping agents for food distribution fields or the like.

In most cases, these superabsorbent polymers have been widely used in the field of hygienic materials such as diapers, sanitary pads, etc. For these applications, superabsorbent polymers are required to exhibit high absorbency with respect to water, etc., not to release the absorbed water even under an external pressure, and also to well maintain their shape even in a state where the volume is expanded (swelled) by absorbing water, thereby exhibiting excellent liquid permeability.

Recently, with increasing demand for thin diapers, a proportion of the superabsorbent polymer tends to relatively increase in the diapers. Therefore, the superabsorbent polymer needs to have the performance of the fibrous materials in the diapers. Further, to improve dryness of hygienic materials, there is an increasing need for superabsorbent polymers to exhibit a high absorption rate as well as high absorbency.

Previously, as a method of improving the absorption rate of superabsorbent polymers, a method of introducing a porous structure into the superabsorbent polymer through foaming polymerization, etc., or a method of increasing a surface area of the superabsorbent polymer by more strongly applying a mechanical/physical load during a gel pulverization step has been known.

However, in the case of the method through the foaming polymerization, the basic absorption performances of the superabsorbent polymer itself are often lowered due to excessive use of a foaming agent. In addition, the method of applying a high mechanical load during the gel pulverization step may also cause excessive destruction of a crosslinked structure inside the superabsorbent polymer, resulting in a decrease in absorption performances such as absorbency under pressure of the superabsorbent polymer. Moreover, when a high mechanical load is applied to a polymer with a low degree of internal crosslinking and high absorption performances such as water retention capacity, etc., during the gel pulverization process, there have been problems in that the instrumental load increases and it is difficult to stably operate the process due to severe stickiness.

Due to the above-described problems, there has been a limit in improving the absorption rate and absorption performances of superabsorbent polymers at the same time, and there is a continuing need to develop a technology capable of further improving the absorption rate while maintaining excellent absorption performances of superabsorbent polymers.

DISCLOSURE

Technical Problem

Accordingly, the present invention provides a method of preparing a superabsorbent polymer, which enables the preparation of the superabsorbent polymer exhibiting an improved absorption rate while maintaining excellent absorption performances.

Technical Solution

The present invention provides a method of preparing a superabsorbent polymer, the method including the steps of:
carrying out a crosslinking polymerization of a water-soluble ethylene-based unsaturated monomer having acidic groups which are at least partially neutralized, in the presence of an internal crosslinking agent represented by Chemical Formula 1, to form a water-containing gel polymer;
gel-pulverizing the water-containing gel polymer;
drying, pulverizing, and size-sorting the gel-pulverized water-containing gel polymer to form a base polymer powder; and
carrying out a surface crosslinking of the base polymer powder by heat treatment in the presence of a surface crosslinking agent,
wherein the gel-pulverizing step is carried out by extruding the water-containing gel polymer through a porous plate having a plurality of holes using a screw extruder mounted inside a cylindrical pulverizer under the condition that a chopping index according to the following Equation 1 is 28 (/s) or more:

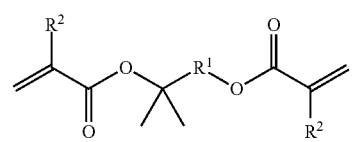

[Chemical Formula 1]

in Chemical Formula 1, $R^1$ is a divalent organic group derived from alkane having 1 to 10 carbon atoms, and $R^2$ is hydrogen or a methyl group, $$\text{Chopping index}(C.I.) = \omega \times (TSC/A) \times \text{number of times of chopping}(T) \qquad \text{[Equation 1]}$$

in Equation 1,
$\omega$ represents angular velocity ($2\pi \times N/60$ s) of screw in the screw extruder, wherein N represents the number of rotation (rpm) of the screw, TSC represents a solid content (%) of the water-containing gel polymer fed into the pulverizer, and A represents porosity ($\pi r^2 \times n/\pi R^2$) of the porous plate, wherein r represents a radius (mm) of the holes formed in the porous plate, n represents the number of holes formed in the porous plate, and R represents a radius (mm) of the porous plate.

Hereinafter, a method of preparing a superabsorbent polymer according to an embodiment of the present invention will be described in more detail.

First, the terminology used herein is only for describing particular embodiments and is not intended to limit the present invention. The singular forms used herein include the plural forms as well, unless the context clearly indicates otherwise.

The term 'including' or 'containing', as used herein, specifies the presence of stated features, regions, integers, steps, operations, elements, or components, but do not preclude the addition of other features, regions, integers, steps, operations, elements, or components.

As used herein, the term 'superabsorbent polymer' refers to a polymer including a base polymer powder including a crosslinked polymer of a water-soluble ethylene-based unsaturated monomer having acidic groups which are at least partially neutralized; and a surface crosslinked layer which is formed on the base polymer powder and is prepared by further crosslinking the crosslinked polymer via a surface crosslinking agent.

According to one embodiment of the present invention, provided is a method of preparing a superabsorbent polymer, the method including the steps of: carrying out a crosslinking polymerization of a water-soluble ethylene-based unsaturated monomer having acidic groups which are at least partially neutralized, in the presence of an internal crosslinking agent represented by Chemical Formula 1, to form a water-containing gel polymer;

gel-pulverizing the water-containing gel polymer;

drying, pulverizing, and size-sorting the gel-pulverized water-containing gel polymer to form a base polymer powder; and carrying out a surface crosslinking of the base polymer powder by heat treatment in the presence of a surface crosslinking agent, wherein the gel-pulverizing step is carried out by extruding the water-containing gel polymer through a porous plate having a plurality of holes using a screw extruder mounted inside a cylindrical pulverizer under the condition that a chopping index according to the following Equation 1 is 28 (/s) or more:

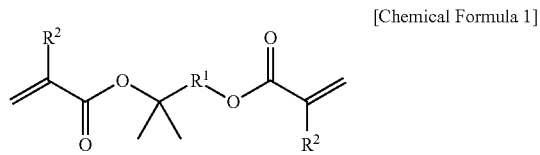

[Chemical Formula 1]

in Chemical Formula 1, $R^1$ is a divalent organic group derived from alkane having 1 to 10 carbon atoms, and $R^2$ is hydrogen or a methyl group, Chopping index(C.I.)=ω×(TSC/A)×number of times of chopping(T)      [Equation 1]

in Equation 1,

ω represents angular velocity (2π×N/60 s) of screw in the screw extruder, wherein N represents the number of rotation (rpm) of the screw, TSC represents a solid content (%) of the water-containing gel polymer fed into the pulverizer, and A represents porosity ($\pi r^2 \times n/\pi R^2$) of the porous plate, wherein r represents a radius (mm) of the holes formed in the porous plate, n represents the number of holes formed in the porous plate, and R represents a radius (mm) of the porous plate.

In the preparation method of one embodiment, the crosslinking polymerization is carried out using the compound of Chemical Formula 1 as an internal crosslinking agent, and the gel pulverization is carried out by applying a predetermined level or more of a mechanical/physical load, i.e., a predetermined level or more of a shear force and a compressive force during the gel pulverization of the crosslinking polymerized water-containing gel polymer.

The compound of Chemical Formula 1 includes a crosslinkable acrylic functional group at both ends, together with a functional group ($R^1$ and a branched chain portion thereof), which is decomposable by high-temperature heat, in the structure. Such a compound of Chemical Formula 1 may form a high-density crosslinked structure in the water-containing gel polymer and the superabsorbent polymer by crosslinking polymerization. Simultaneously, a part of the structure of the compound of Chemical Formula 1 may be thermally decomposed by high-temperature heat treatment during surface crosslinking, and as a result, the crosslinking density of the superabsorbent polymer may become loose again.

In other words, in the preparation method of one embodiment, a water-containing gel polymer having a high crosslinking density may be formed by using a sufficient amount of the internal crosslinking agent during the crosslinking polymerization, and a mechanical load may be applied thereto, thereby increasing the surface area of the water-containing gel polymer. In particular, due to high crosslinking density of the water-containing gel polymer or absorption performances such as lowered water retention capacity caused thereby, etc., a large surface area may be achieved without an instrumental load, thereby further improving the absorption rate of superabsorbent polymer.

After the gel pulverization, when drying, pulverizing, and size-sorting processes are carried out and then the surface crosslinking process is carried out, the surface crosslinking density of the superabsorbent polymer is increased, and the internal crosslinking density thereof may be decreased by thermal decomposition of the compound of Chemical Formula 1. As described, since the internal crosslinking density of the superabsorbent polymer is decreased, a finally prepared superabsorbent polymer may absorb a large amount of water inside thereof, thereby exhibiting excellent absorption performances.

Therefore, according to the method of one embodiment, the superabsorbent polymer may maintain excellent absorption performances while exhibiting an improved absorption rate without the problem of an instrumental load, etc.

Hereafter, each step of the preparation method of one embodiment will be described in more detail.

First, the first step is a step of preparing a water-containing gel polymer, specifically, a step of preparing a water-containing gel polymer by carrying out a crosslinking polymerization of a monomer composition including a water-soluble ethylene-based unsaturated monomer having acidic groups which are at least partially neutralized, in the presence of an internal crosslinking agent.

The water-soluble ethylene-based unsaturated monomer may be any monomer commonly used in the preparation of superabsorbent polymers. Specifically, the water-soluble ethylene-based unsaturated monomer may be a compound represented by the following Chemical Formula 1:

 [Chemical Formula 1]

in Chemical Formula 1, $R^1$ is an alkyl group containing an unsaturated bond and having 2 to 5 carbon atoms, and $M^1$ is a hydrogen atom, a monovalent or divalent metal, an ammonium group, or an organic amine salt.

Preferably, the water-soluble ethylene-based unsaturated monomer may include one or more selected from the group consisting of acrylic acid, methacrylic acid, and a monovalent metal salt thereof, a divalent metal salt thereof, an ammonium salt thereof, and an organic amine salt thereof. As described, when acrylic acid or a salt thereof is used as the water-soluble ethylene-based unsaturated monomer, it is advantageous in terms of obtaining a superabsorbent polymer having improved absorbency. In addition, the monomer may include one or more selected from the group consisting of an anionic monomer such as maleic anhydride, fumaric acid, crotonic acid, itaconic acid, 2-acryloyl ethane sulfonic acid, 2-methacryloyl ethane sulfonic acid, 2-(meth)acryloyl propane sulfonic acid, or 2-(meth)acrylamide-2-methylpropane sulfonic acid, and a salt thereof; a nonionic hydrophilic monomer such as (meth)acrylamide, N-substituted (meth)acrylate, 2-hydroxyethyl(meth)acrylate, 2-hydroxypropyl (meth)acrylate, methoxypolyethyleneglycol(meth)acrylate, or polyethyleneglycol(meth)acrylate; and an unsaturated monomer containing an amino group such as (N,N)-dimethylaminoethyl(meth)acrylate or (N,N)-dimethylaminopropyl(meth)acrylamide, and a quaternary compound thereof.

The water-soluble ethylene-based unsaturated monomer may have an acidic group, in which at least a part of the acidic group is neutralized. Preferably, those partially neutralized with an alkaline substance such as sodium hydroxide, potassium hydroxide, ammonium hydroxide or the like may be used as the monomer.

At this time, the degree of neutralization of the monomer may be 40 mol % to 95 mol %, or 40 mol % to 80 mol %, or 45 mol % to 75 mol %. The range of the degree of neutralization may vary depending on the final physical properties. An excessively high degree of neutralization causes the neutralized monomers to be precipitated, and thus polymerization may not readily occur. On the contrary, an excessively low degree of neutralization not only deteriorates the absorbency of the polymer but also endows the polymer with hard-to-handle properties, like elastic rubber.

The monomer composition may include a polymerization initiator commonly used in the preparation of superabsorbent polymers.

As the polymerization initiator, a thermal polymerization initiator, a photopolymerization initiator or the like may be used depending on the polymerization method. However, even in the case of the photo-polymerization method, a certain amount of heat is generated by ultraviolet irradiation, etc., and a certain amount of heat is generated in accordance with the progression of the polymerization reaction, which is an exothermic reaction, and therefore, a thermal polymerization initiator may further be included.

The photo-polymerization initiator may include, for example, one or more compounds selected from the group consisting of benzoin ether, dialkyl acetophenone, hydroxyl alkyl ketone, phenyl glyoxylate, benzyl dimethyl ketal, acyl phosphine, and α-aminoketone. Among them, as a specific example of the acylphosphine, a commercially available lucirin TPO, i.e., 2,4,6-trimethyl-benzoyl-trimethyl phosphine oxide may be used. More various photo-polymerization initiators are well disclosed in "UV Coatings: Basics, Recent Developments and New Application (Elsevier, 2007)" written by Reinhold Schwalm, p 115, the content of which is incorporated herein by reference.

As the thermal polymerization initiator, one or more compounds selected from the group consisting of a persulfate-based initiator, an azo-based initiator, hydrogen peroxide, and ascorbic acid may be used. Specific examples of the persulfate-based initiator may include sodium persulfate ($Na_2S_2O_8$), potassium persulfate ($K_2S_2O_8$), ammonium persulfate (($NH_4)_2S_2O_8$), etc. In addition, examples of the azo-based initiator may include 2,2-azobis(2-amidinopropane)dihydrochloride, 2,2-azobis-(N,N-dimethylene)isobutyramidine dihydrochloride, 2-(carbamoylazo)isobutylonitril, 2,2-azobis[2-(2-imidazolin-2-yl)propane] dihydrochloride, 4,4-azobis-(4-cyanovaleric acid), etc. More various thermal polymerization initiators are well disclosed in "Principle of Polymerization (Wiley, 1981)" written by Odian, p 203, the content of which is incorporated herein by reference.

The polymerization initiator may be included at a concentration of about 0.001% by weight to about 1% by weight, or 0.005% by weight to about 0.5% by weight, based on the monomer composition. In other words, when the concentration of the polymerization initiator is too low, the polymerization rate may become slow and a large amount of residual monomer may be extracted in the final product, which is not preferred. On the contrary, when the concentration of the polymerization initiator is too high, polymer chains constituting the network become short, and thus the content of water-soluble components is increased and physical properties of the polymer may deteriorate such as a reduction in absorbency under pressure.

Meanwhile, the polymerization of the monomer composition may be carried out in the presence of a crosslinking agent ("internal crosslinking agent") in order to improve physical properties of the polymer by polymerization of the water-soluble ethylene-based unsaturated monomer. The crosslinking agent is used for internal crosslinking of the water-containing gel polymer, and is used separately from "a surface crosslinking agent" described below.

In the method of one embodiment, the compound of Chemical Formula 1 is mainly used as the internal crosslinking agent. This compound may cause the crosslinking reaction to form a crosslinking structure having a high crosslinking density inside the water-containing gel polymer, etc. Simultaneously, the compound of Chemical Formula 1 includes a thermally degradable functional group in the structure, and a part of the structure may be thermally degraded by high-temperature heat treatment during the surface crosslinking.

In Chemical Formula 1, $R^1$ is, as defined above, a divalent organic group derived from alkane having 1 to 10 carbon atoms, and $R^2$ is hydrogen or a methyl group. In this regard, the alkane may be linear, branched, or cyclic alkane, and the divalent organic group derived from alkane may be a divalent organic group, in which two hydrogens are removed from one carbon, or a divalent organic group, in which one hydrogen is removed from each of different carbon atoms. Specifically, $R^1$ may be methane-1,1-diyl, ethane-1,2-diyl, ethane-1,1-diyl, propane-1,3-diyl, propane-1,2-diyl, propane-1,1-diyl, n-butane-1,4-diyl, n-butane-1,3-diyl, n-butane-1,2-diyl, n-butane-1,1-diyl, 2-methylpropane-1,3-diyl, 2-methylpropane-1,2-diyl, 2-methylpropane-1,1-diyl, 2-methylbutane-1,4-diyl, 2-methylbutane-2,4-diyl, 2-methylbutane-3,4-diyl, 2-methylbutane-4,4-diyl, 2-methylbutane-1,3-diyl, 2-methylbutane-1,2-diyl, 2-methylbutane-1,1-diyl, 2-methylbutane-2,3-diyl, 3-methylbutane-1,1-diyl, 3-methylbutane-1,2-diyl, 3-methylbutane-1,3-diyl, or 3-methylbutane-2,3-diyl.

Among them, $R^1$ in Chemical Formula 1 may be methane-1,1-diyl, propane-1,3-diyl, propane-1,2-diyl, propane-1,1-diyl, n-butane-1,4-diyl, n-butane-1,3-diyl, n-butane-1,2-diyl, n-butane-1,1-diyl, 2-methylpropane-1,3-diyl, 2-methylpropane-1,2-diyl, 2-methylpropane-1,1-diyl, 2-methylbutane-1,4-diyl, 2-methylbutane-2,4-diyl, 2-methylbutane-3,4-diyl, 2-methylbutane-4,4-diyl, 2-methylbutane-1,3-diyl, 2-methylbutane-1,2-diyl, 2-methylbutane-1,1-diyl, 2-methylbutane-2,3-diyl, 3-methylbutane-1,2-diyl, or 3-methylbutane-1,3-diyl.

Specifically, $R^1$ in Chemical Formula 1 may be methane-1,1-diyl, propane-1,3-diyl, propane-1,2-diyl, or 3-methylbutane-1,3-diyl. More specifically, $R^1$ in Chemical Formula 1 may be 3-methylbutane-1,3-diyl.

The compound, in which $R^1$ in Chemical Formula 1 is the above-listed divalent organic group, may provide an internal crosslinked structure, of which degradability is easily controlled by heat energy, and may not produce by-products or water-soluble components that change the overall properties of the superabsorbent polymer after degradation.

The internal crosslinking agent may further include an additional internal crosslinking agent known in the art to which the present invention pertains, in addition to the compound represented by Chemical Formula 1. Such an additional internal crosslinking agent may be a compound including two or more crosslinkable functional groups in the molecule. The additional internal crosslinking agent may include a carbon-carbon double bond as the crosslinkable functional group for smooth crosslinking polymerization reaction of the above-described water-soluble ethylene-based unsaturated monomer. Specifically, the additional internal crosslinking agent may include one or more selected from the group consisting of N,N'-methylenebisacrylamide, trimethylolpropane tri(meth)acrylate, ethylene glycol di(meth)acrylate, polyethylene glycol(meth)acrylate, propylene glycol di(meth)acrylate, polypropylene di(meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, pentaerythritol tetraacrylate, triallylamine, allyl(meth)acrylate, ethylene glycol diglycidyl ether, propylene glycol, glycerin, and ethylene carbonate. In addition, various compounds which have been known to be used as the internal crosslinking agent of superabsorbent polymers may be used as the additional internal crosslinking agent.

The internal crosslinking agent may include 10% by weight to 100% by weight, or 30% by weight to 100% by weight, or 50% by weight to 90% by weight of the compound of Chemical Formula 1, and optionally, the remaining amount of the additional internal crosslinking agent, based on the total weight of the internal crosslinking agent, such that the superabsorbent polymer has a desired level of a crosslinking density gradient. However, in terms of providing a superabsorbent polymer having improved absorption performances and absorption rate at the same time, only the compound of Chemical Formula 1 may be used as the internal crosslinking agent. In other words, the internal crosslinking agent may include 100% by weight of the compound of Chemical Formula 1, based on the total weight.

The internal crosslinking agent may be used in an amount of 0.01 part by weight to 5 parts by weight with respect to 100 parts by weight of the water-soluble ethylene-based unsaturated monomer. For example, the internal crosslinking agent may be used in an amount of 0.01 part by weight or more, 0.05 parts by weight or more, or 0.1 part by weight or more, and 5 parts by weight or less, 3 parts by weight or less, 2 parts by weight or less, or 1 part by weight or less with respect to 100 parts by weight of the water-soluble ethylene-based unsaturated monomer. In this regard, the content of the water-soluble ethylene-based unsaturated monomer is based on the weight of the water-soluble ethylene-based unsaturated monomer before neutralization of the acidic groups of the monomers having acidic groups included in the water-soluble ethylene-based unsaturated monomer. For example, when the water-soluble ethylene-based unsaturated monomer includes acrylic acid, the content of the internal crosslinking agent may be controlled, based on the weight of the monomer before neutralization of acrylic acid. When the content of the internal crosslinking agent is excessively low, sufficient thermal degradation may not occur due to a heat treatment process described below, and when the content of the internal crosslinking agent is excessively high, the internal crosslinking density becomes high, and thus it is difficult to achieve desired absorption performances.

Meanwhile, the crosslinking polymerization of the monomer composition may be carried out in the presence of a foaming agent depending on the need and extent of additional improvement of the absorption rate. Such a foaming agent may be degraded to generate gas during the crosslinking polymerization reaction, thereby forming pores in the water-containing gel polymer. The further use of the foaming agent results in a more developed porous structure inside the superabsorbent polymer, which may further improve the absorption rate of the superabsorbent polymer.

Non-limiting example of the foaming agent may include one or more compounds selected from the group consisting of sodium bicarbonate, sodium carbonate, potassium bicarbonate, potassium carbonate, calcium bicarbonate, calcium bicarbonate, magnesium bicarbonate, magnesium carbonate, azodicarbonamide (ADCA), dinitroso pentamethylene tetramine (DPT), p,p'-oxybis(benzenesulfonyl hydrazide) (OBSH), p-toluenesulfonyl hydrazide (TSH), sucrose stearate, sucrose palmitate, and sucrose laurate.

The foaming agent may exist in amount of 1000 to 4000 ppmw, more specifically, in amount of 1000 ppm or more, or 1100 ppmw or more, or 1200 ppmw or more; and 4000 ppmw or less, or 3500 ppmw or less, or 3000 ppmw or less in the monomer composition.

In addition, the monomer composition may further include additives such as a thickener, a plasticizer, a preservation stabilizer, an antioxidant, or an inorganic material, as needed.

The monomer composition may be prepared in the form of a solution, in which the raw materials such as the above-described water-soluble ethylene-based unsaturated monomer, polymerization initiator, internal crosslinking agent, and foaming agent are dissolved in a solvent.

In this regard, as the usable solvent, any solvent may be used without limitations in the constitution as long as it is able to dissolve the above ingredients. For example, as the solvent, water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, N,N-dimethylacetamide, or a mixture thereof may be used.

Formation of the water-containing gel polymer through polymerization of the monomer composition may be carried out by a common polymerization method, and a process thereof is not particularly limited.

For non-limiting example, the polymerization method is largely classified into thermal polymerization and photo-polymerization according to a polymerization energy source. The thermal polymerization may be carried out in a reactor like a kneader equipped with agitating spindles. The photo-polymerization may be carried out in a reactor equipped with a movable conveyor belt.

For example, the monomer composition is injected to the reactor like the kneader equipped with the agitating spindles, and thermal polymerization is carried out by providing hot air thereto or by heating the reactor, thereby obtaining the water-containing gel polymer. In this regard, the water-containing gel polymer may have a size of centimeters or millimeters when it is discharged from an outlet of the reactor, according to the type of agitating spindles equipped in the reactor. Specifically, the water-containing gel polymer may be obtained in various forms according to a concentration of the monomer composition fed thereto, a feeding speed or the like, and the water-containing gel polymer having a (weight average) particle size of 2 mm to 50 mm may be generally obtained.

For another example, when the monomer composition is subjected to photo-polymerization in the reactor equipped with the movable conveyor belt, the water-containing gel polymer may be obtained in a sheet-type. In this regard, the thickness of the sheet may vary according to the concentration of the monomer composition fed thereto and the feeding speed. The sheet is preferably controlled to have a thickness of 0.5 cm to 10 cm in order to assure the production speed while allowing the entire sheet to be uniformly polymerized.

The water-containing gel polymer formed by the method may exhibit a water content of 40% by weight to 80% by weight. The water content, as used herein, means a weight occupied by water with respect to the total weight of the water-containing gel polymer, which may be a value obtained by subtracting the weight of the dried polymer from the weight of the water-containing gel polymer. Specifically, the water content may be defined as a value calculated by measuring the weight loss due to evaporation of moisture in the polymer during the process of drying by raising the temperature of the polymer through infrared heating. At this time, the drying conditions may be determined as follows: the drying temperature is increased from room temperature to about 180° C. and then the temperature is maintained at 180° C., and the total drying time is set to 20 minutes, including 5 minutes for the temperature rising step.

Meanwhile, after carrying out the above-described cross-linking polymerization, the step of gel-pulverizing the water-containing gel polymer is carried out. As a result, the size of the water-containing gel may be reduced and the surface area thereof may be increased, thereby increasing efficiency of the subsequent drying. Furthermore, in the method of one embodiment, it is possible to control the shape of the water-containing gel polymer or the surface area thereof by adjusting the gel pulverizing conditions to meet the chopping index, thereby greatly improving the absorption rate of the superabsorbent polymer.

In this regard, a pulverizer used herein is not limited by its configuration, and specifically, it may include any one selected from the group consisting of a vertical pulverizer, a turbo cutter, a turbo grinder, a rotary cutter mill, a cutter mill, a disc mill, a shred crusher, a crusher, a chopper, and a disc cutter, but is not limited to the above-described examples.

Meanwhile, during the gel pulverization of the water-containing gel polymer, a shear force and a compressive force are applied to the water-containing gel polymer. The method of one embodiment is characterized in that the shear force and the compressive force are controlled within a proper range by controlling gel pulverization conditions. The shear force is associated with the force acting when the water-containing gel polymer is extruded into the pulverizer, and the compressive force is associated with the force acting when the water-containing gel polymer is passed through the pulverizer.

Specifically, the step of gel-pulverizing the water-containing gel polymer may be carried out by extruding the water-containing gel polymer through a porous plate having a plurality of holes using a screw extruder mounted inside a cylindrical pulverizer under the condition that a chopping index according to the following Equation 1 (/s) is 28 (/s) or more, 30 (/s) to 40 (/s), or 31 (/s) to 35 (/s):

$$\text{Chopping index}(C.I.) = \omega \times (TSC/A) \times \text{number of times of chopping}(T) \quad \text{[Equation 1]}$$

in Equation 1, $\omega$ represents angular velocity ($2\pi \times N/60$ s) of screw in the screw extruder, wherein N represents the number of rotation (rpm) of the screw, TSC represents a solid content (%) of the water-containing gel polymer fed into the pulverizer, and A represents porosity ($\pi r^2 \times n/\pi R^2$) of the porous plate, wherein r represents a radius (mm) of the holes formed in the porous plate, n represents the number of holes formed in the porous plate, and R represents a radius (mm) of the porous plate.

It was confirmed that as the gel pulverization is carried out to meet the above-described chopping index, it is possible to further improve the absorption rate while reducing deterioration of other physical properties. If the gel pulverization is carried out under the condition of an excessively high chopping index, the instrumental load is increased, and other physical properties of the superabsorbent polymer, such as absorption performances and/or liquid permeability, etc., may be reduced. On the contrary, when the chopping index is low, it is difficult to expect the improvement of the absorption rate, and efficiency of the subsequent drying is reduced, and deterioration of the superabsorbent polymer may occur to reduce overall physical properties thereof.

When the above-described gel pulverizing process is carried out, crumb-shaped water-containing gel polymer particles may be formed. When subsequent drying, pulverizing, and size-sorting processes may be carried out, a very large surface area may be realized to obtain a base polymer powder and a superabsorbent polymer having greatly improved absorption rate.

After the gel pulverizing, the water-containing gel polymer particles formed in the form of crumbs may have a particle diameter of 0.1 mm to 10 mm. In other words, to increase the drying efficiency, the water-containing gel polymer is preferably pulverized into particles of 10 mm or less. However, since excessive pulverization may cause aggregation between particles, the water-containing gel polymer is preferably pulverized into particles of 0.1 mm or more.

In addition, since the pulverization of the water-containing gel polymer is carried out at a high water content, a phenomenon in which the water-containing gel polymer sticks to the surface of the pulverizer may occur. In order to minimize this phenomenon, steam, water, a surfactant, an anti-agglomerating agent (e.g., clay, silica, etc.); a persulfate-based initiator, an azo-based initiator, hydrogen peroxide, a thermal polymerization initiator, an epoxy-based crosslinking agent, a diol-based crosslinking agent, a cross-linking agent including multifunctional acrylate such as difunctional or trifunctional acrylate, or a mono-functional crosslinking agent including a hydroxyl group may be added to the water-containing gel polymer, if necessary.

Meanwhile, after the above-described gel pulverization step, the gel-pulverized water-containing gel polymer may be dried.

The drying may be carried out at a temperature of 120° C. to 250° C., or 140° C. to 200° C., or 150° C. to 190° C. In this regard, the drying temperature may be defined as a temperature of a heating medium provided for drying, or an internal temperature of a drying reactor including the heating medium and the polymer during the drying process. If the drying temperature is low and therefore the drying time becomes long, the process efficiency may be decreased. In order to prevent this problem, the drying temperature is preferably 120° C. or higher. In addition, when the drying temperature is higher than necessary, the surface of the water-containing gel polymer is excessively dried, and thus there is a concern about generation of fine particles during the subsequent pulverization process and deterioration of the physical properties of a final polymer. In order to prevent this problem, therefore, the drying temperature is preferably 250° C. or lower.

In this regard, the drying time in the drying step is not particularly limited, but may be controlled to 20 minutes to 90 minutes at the above drying temperature, in view of process efficiency and physical properties of the polymer.

The drying may be carried out by using a general medium, and for example, the pulverized water-containing gel polymer may be supplied with hot air, or irradiated with infrared rays, microwaves, ultraviolet rays, or the like.

The drying as above is performed such that the dried polymer may preferably have the water content of about 0.1% by weight to about 10% by weight. In other words, if the water content of the dried polymer is less than 0.1% by weight, production costs may be increased and degradation of the crosslinked polymer may undesirably occur due to excessive drying. If the water content of the dried polymer is more than 10% by weight, defects may occur in the subsequent process, which is not preferred.

Subsequently, the dried water-containing gel polymer may be pulverized. This is a step of optimizing the surface area of the base polymer powder and the superabsorbent polymer. The pulverization may be carried out such that the particle size of the pulverized polymer is 150 µm to 850 µm.

A pulverizer applicable herein may include a pin mill, a hammer mill, a screw mill, a roll mill, a disc mill, a jog mill, or the like which is commonly used.

In order to manage physical properties of the superabsorbent polymer finally produced, a step of selectively size-sorting particles having a particle size of 150 µm to 850 µm from the polymer particles obtained through the pulverization step may be further carried out.

The base polymer powder may be obtained through the above-described size-sorting process. The base polymer powder thus obtained may have a particle size of 150 µm to 850 µm, and may include fine powder having a particle size of less than 150 µm in an amount of 2% by weight or less, or 1% by weight or less.

Meanwhile, after preparing the base polymer powder, the base polymer powder may be surface-crosslinked by heat treatment in the presence of a surface crosslinking agent. Through the surface crosslinking step, an additional surface crosslinked layer may be formed on the base polymer powder.

Such a surface crosslinking step may be carried out under general surface crosslinking conditions of superabsorbent polymers, for example, carried out by a method of mixing and crosslinking a solution containing a surface crosslinking agent with the base polymer powder.

Here, the surface crosslinking agent is a compound reactable with a functional group of the base polymer powder, and any multifunctional compound which has been known to be used as the surface crosslinking agent during the preparation process of the superabsorbent polymer may be used.

Specific examples of the surface crosslinking agent may include one or more polyols selected from the group consisting of ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol, and glycerol; one or more alkylene carbonate-based compounds selected from the group consisting of ethylene carbonate and propylene carbonate; epoxy compounds such as ethylene glycol diglycidyl ether, etc.; oxazoline compounds such as oxazolidinone, etc.; polyamine compounds; mono-, di- or polyoxazolidinone compounds; or cyclic urea compounds, etc. In addition, other various surface crosslinking agents may be used.

Among these surface crosslinking agents, alkylene carbonate having 2 to 5 carbon atoms may be preferably used, and ethylene carbonate may be more preferably used as the surface crosslinking agent.

Further, together with the surface crosslinking agent, one or more inorganic materials selected from the group consisting of silica, clay, alumina, silica-alumina composite, titania, zinc oxide, and aluminum sulfate may be further used. Further, in order to adjust the penetration speed and depth of the surface crosslinking agent, an acidic compound or a polymer may be further added, as needed. By additional use of these inorganic materials, etc., liquid permeability or anti-caking property of the superabsorbent polymer may be further improved, and a process flow, etc. may be further improved.

Meanwhile, the content of the surface crosslinking agent may be appropriately adjusted according to the kind or reaction conditions of the crosslinking agent, and preferably, adjusted to 0.01 part by weight to 3 parts by weight, or 0.03 parts by weight to 2 parts by weight, or 0.05 parts by weight to 1 part by weight, based on 100 parts by weight of the base polymer powder. If the content of the surface crosslinking agent is excessively low, surface modification may not properly occur, thereby reducing liquid permeability or gel strength of a final polymer. On the contrary, when an excessively large amount of the surface crosslinking agent is used, absorption performances of the polymer may be rather deteriorated due to excessive surface crosslinking reaction, which is not preferred.

Meanwhile, the surface crosslinking step may be carried out by a common method such as a method of adding and mixing the surface crosslinking agent and the base polymer powder in a reactor, a method of spraying the surface crosslinking agent onto the base polymer powder, or a method of continuously feeding the base polymer powder and the surface crosslinking agent to a mixer which is continuously operated.

Further, when the surface crosslinking agent is added, water may be further added. As described, the surface crosslinking agent is added together with water, thereby inducing uniform dispersion of the surface crosslinking agent, preventing agglomeration of polymer particles, and further optimizing the penetration depth of the surface crosslinking agent into the polymer particles. In view of these purpose and effects, a content of water added together with the surface crosslinking agent may be adjusted to 0.5 parts by weight to 10 parts by weight with respect to 100 parts by weight of the base polymer powder.

Further, the surface crosslinking step may be carried out at a temperature of 80° C. to 200° C. Further, the surface modification may be carried out for 20 minutes to 120 minutes, or 30 minutes to 100 minutes, or 40 minutes to 80 minutes. When the surface crosslinking is carried out under these heat treatment conditions, thermal degradation of the compound of Chemical Formula 1 may occur in an appropriate level, and the surface crosslinking reaction may also occur in a desired level. As a result, liquid permeability, gel strength, and absorption performances of the superabsorbent polymer may be further improved.

Meanwhile, according to an embodiment of the present invention, provided is a superabsorbent polymer prepared according to the above-described method.

The superabsorbent polymer includes the base polymer powder including the crosslinked polymer of the water-soluble ethylene-based unsaturated monomer having acidic groups which are at least partially neutralized; and the surface crosslinked layer which is formed on the base polymer powder and is prepared by further crosslinking the crosslinked polymer via the surface crosslinking agent.

The superabsorbent polymer may be obtained as particles having a particle size of 150 μm to 850 μm.

Such a superabsorbent polymer includes a crosslinked structure derived from the compound of Chemical Formula 1 in the base polymer powder, and a part of the structure derived from the compound of Chemical Formula 1 is destructed by thermal degradation. Further, the superabsorbent polymer may have a large surface area due to gel pulverization under the chopping index previously described.

Due to these overall properties, the superabsorbent polymer may exhibit excellent absorption performances due to relatively low internal crosslinking density, and a high absorption rate due to the larger surface area.

The excellent absorption performances of the superabsorbent polymer may be confirmed by centrifuge retention capacity (CRC).

Specifically, the base polymer powder prepared by the above-described method may have a centrifuge retention capacity (CRC) of 35 g/g to 50 g/g, or 36 g/g to 45 g/g, or 37 g/g to 43 g/g for a physiological saline solution (0.9% by weight of sodium chloride aqueous solution) for 30 minutes. The centrifuge retention capacity may be determined in accordance with European Disposables and Nonwovens Association (EDANA) standard EDANA WSP 241.3, and may be calculated according to Equation A described in Experimental Example of this application.

Further, the improved absorption rate of the superabsorbent polymer may be defined by an absorption rate as measured by a vortex method.

Specifically, the superabsorbent polymer may have an absorption rate of 35 sec to 70 sec, or 40 sec to 68 sec, as measured by a vortex method. Such an absorption rate may be confirmed by a method of measuring a time (unit: sec) required for a vortex of a liquid to disappear by rapid absorption when the superabsorbent polymer is added to a physiological saline solution.

Effect of the Invention

A method of preparing a superabsorbent polymer according to the present invention enables the preparation of the superabsorbent polymer exhibiting a more improved absorption rate while maintaining excellent absorption performances. Such a superabsorbent polymer may be appropriately applied to a hygienic material such as a diaper, in particular, an ultra-thin hygienic material.

EXAMPLES

Hereinafter, preferred examples are provided for better understanding of the present invention. However, the following Examples are only for illustrating the present invention, and the present invention is not limited thereto.

Example 1

As a device for preparing a superabsorbent polymer, a continuous preparation system consisting of a polymerization process, a water-containing gel pulverizing process, a drying process, a pulverizing process, a size-sorting process, a surface crosslinking process, a cooling process, a size-sorting process, and a transport process connecting each process was used.

To 100 parts by weight of acrylic acid, 123.5 g of 32 wt % caustic soda (NaOH), 0.2 g of sodium persulfate as a thermal polymerization initiator, 0.008 g of diphenyl(2,4,6-trimethylbenzoyl)-phosphine oxide as a photo-polymerization initiator, 0.6 g of 3-methylbutane-1,3-diyl diacrylate (a compound of Chemical Formula 1), 0.18 g of laponite, and 55.0 g of water were added and mixed with each other, thereby preparing a monomer composition having a total solid content of 43.8% by weight.

The monomer composition was fed to a rotary belt having a width of 10 cm and a length of 2 m and rotating at a speed of 50 cm/min at a feed rate of 500 mL/min to 2,000 mL/min. While feeding the monomer composition, ultraviolet light was irradiated at an intensity of 10 mW/cm$^2$ to allow a photo-polymerization reaction for 60 seconds. After cutting the sheet-shaped water-containing gel polymer obtained by the polymerization reaction to a size of 3 cm×3 cm, pulverizing/chopping were carried out by extruding the water-containing gel polymer through a porous plate having a plurality of holes using a screw extruder (meat chopper) mounted inside a cylindrical pulverizer under the conditions of a chopping index shown in the following Equation 1 and Table 1:

Chopping index(C.I.)=ω×(TSC/$A$)×number of times of chopping($T$) [Equation 1]

in Equation 1,

ω represents angular velocity (2π×N/60 s) of screw in the screw extruder, wherein N represents the number of rotation (rpm) of the screw, TSC represents a solid content (%) of the water-containing gel polymer fed into the pulverizer, and A represents porosity (π$r^2$×n/π$R^2$) of the porous plate, wherein r represents a radius (mm) of the holes formed in the porous plate, n represents the number of holes formed in the porous plate, and R represents a radius (mm) of the porous plate.

Thereafter, the gel-pulverized water-containing gel polymer was dried using an air-flow oven at 185° C. for 40 minutes, and pulverized and size-sorted into a particle size of 150 μm to 850 μm.

To 100 g of the base polymer powder thus formed, a mixed solution of a surface crosslinking agent of 3.2 g of ultra-pure water, 4.0 g of methanol, 0.088 g of ethylene carbonate, and 0.01 g of silica (DM30S) was added, and mixed for 1 minute. This mixture was heat-treated at 185° C. for 90 minutes to allow surface crosslinking, followed by size-sorting. Thus, superabsorbent polymer particles having a particle size of 150 μm to 850 μm were prepared.

Examples 2 and 3

Superabsorbent polymer particles of Examples 2 and 3 were prepared in the same manner as in Example 1, except for varying the chopping index and conditions to achieve the same during gel pulverization as in the following Table 1.

Comparative Example 1

Superabsorbent polymer particles of Comparative Example 1 were prepared in the same manner as in Example 1, except that 3-methylbutane-1,3-diyl diacrylate (the compound of Chemical Formula 1) was not used, and 0.24 g of polyethylene glycol diacrylate (PEGDA) was used.

Comparative Example 2

Superabsorbent polymer particles of Comparative Example 2 were prepared in the same manner as in Comparative Example 1, except that 0.45 g of polyethylene glycol diacrylate (PEGDA) was used.

Comparative Examples 3 and 4

Superabsorbent polymer particles of Comparative Examples 3 and 4 were prepared in the same manner as in Example 1, except for varying the chopping index and conditions to achieve the same during gel pulverization as in the following Table 1.

TABLE 1

| | Number of times of chopping T (times) | N (rpm) | TSC (%) | R (mm) | R (mm) | n | Chopping index (/s) |
|---|---|---|---|---|---|---|---|
| Example 1 | 1 | 180 | 45 | 5 | 42 | 19 | 31.5 |
| Example 2 | 1 | 150 | 45 | 4 | 42 | 24 | 32.5 |
| Example 3 | 2 | 120 | 45 | 8 | 42 | 10 | 31.2 |
| Comparative Example 1 | 1 | 180 | 45 | 5 | 42 | 19 | 31.5 |
| Comparative Example 2 | 1 | 180 | 45 | 5 | 42 | 19 | 31.5 |
| Comparative Example 3 | 1 | 120 | 45 | 8 | 42 | 10 | 15.6 |
| Comparative Example 4 | 1 | 180 | 45 | 9 | 42 | 7 | 26.4 |

Experimental Example

Each of the superabsorbent polymers prepared in Examples and Comparative Examples was measured and evaluated for physical properties by the following method.

(1) Centrifuge Retention Capacity (CRC)

The centrifuge retention capacity (CRC) by absorbency under no load was measured in accordance with European Disposables and Nonwovens Association (EDANA) standard EDANA WSP 241.3.

In detail, the superabsorbent polymer (or base polymer powder; the same applies hereinafter) $W_0$ (g, about 2.0 g) was uniformly placed into a nonwoven-fabric-made bag, followed by sealing. Then, the bag was immersed at room temperature in a physiological saline solution which is a 0.9% by weight sodium chloride aqueous solution. After 30 minutes, the bag was drained at 250 G for 3 minutes with a centrifuge, and the weight $W_2$ (g) of the bag was then measured. Further, the same procedure was carried out without the superabsorbent polymer, and the resultant weight $W_1$ (g) was measured. From these weights thus obtained, CRC (g/g) was calculated according to the following Equation A to confirm the water retention capacity:

$$CRC(g/g) = \{[W_2(g) - W_1(g) - W_0(g)]/W_0(g)\} \quad \text{[Equation A]}$$

(2) Absorption Rate by Vortex Method

The absorption rate of each superabsorbent polymer (or base polymer powder; the same applies hereinafter) of Examples and Comparative Examples was measured in seconds in accordance with a method described in International Patent Application No. 1987-003208.

In detail, the absorption rate (or vortex time) was calculated by measuring a time in seconds, which was required until a vortex disappears, after adding 2 g of the superabsorbent polymer to 50 mL of a physiological saline solution at 23° C. to 24° C. and then agitating it using a magnetic bar (8 mm in diameter and 31.8 mm in length) at 600 rpm.

The physical properties of Examples/Comparative Examples measured by the above-described method are summarized in the following Table 2.

Referring to Table 1, Examples 1 to 4 were confirmed to exhibit excellent CRC and absorption rate, since the thermally degradable compound of Chemical Formula 1 was used as the internal crosslinking agent and gel pulverization was carried out under the predetermined chopping index condition. In contrast, in Comparative Example 1, in which a common internal crosslinking agent was used in a reduced amount, instead of the compound of Chemical Formula 1, in order to increase CRC, gel pulverization itself was not available due to the increased instrumental load. Further, it was confirmed that Comparative Example 2 showed poor absorption performances, as compared with Examples, and Comparative Examples 3 and 4 which were out of the appropriate chopping index range showed poor absorption rates.

The invention claimed is:

1. A method of preparing a superabsorbent polymer, the method comprising:

carrying out a crosslinking polymerization of a water-soluble ethylene-based unsaturated monomer having acidic groups which are at least partially neutralized, in the presence of an internal crosslinking agent including a compound of Chemical Formula 1, to form a water-containing gel polymer;

gel-pulverizing the water-containing gel polymer;

drying, pulverizing, and size-sorting the gel-pulverized water-containing gel polymer to form a base polymer powder; and carrying out a surface crosslinking of the base polymer powder by heat treatment in the presence of a surface crosslinking agent, wherein the gel-pulverizing is carried out by extruding the water-containing gel polymer through a porous plate having a plurality of holes using a screw extruder mounted inside a cylindrical pulverizer under a condition that a chopping index according to the following Equation 1 is 28 (/s) or more:

TABLE 2

| | Example 1 | Example 2 | Example 3 | Comparative Example 1 | Comparative Example 2 | Comparative Example 3 | Comparative Example 4 |
|---|---|---|---|---|---|---|---|
| CRC (superabsorbent polymer; g/g) | 42.2 | 38.4 | 39.3 | Gel pulverization not available | 31.2 | 43.2 | 38.2 |
| Absorption rate (superabsorbent polymer; sec) | 68 | 45 | 57 | | 46 | 107 | 89 |

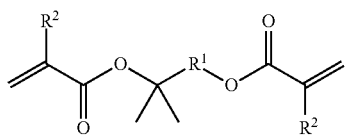

[Chemical Formula 1]

wherein in Chemical Formula 1, $R^1$ is a divalent organic group derived from alkane having 1 to 10 carbon atoms, and $R^2$ is hydrogen or a methyl group, Chopping index(C.I.)=ω×(TSC/A)×number of times of chopping(T)      [Equation 1]

wherein in Equation 1,

ω represents angular velocity (2π×N/60 s) of screw in the screw extruder, wherein in angular velocity (2π×N/60 s), N represents a number of rotation (rpm) of the screw, TSC represents a solid content (%) of the water-containing gel polymer fed into the pulverizer, and A represents porosity ($πr^2$×n/$πR^2$) of the porous plate, wherein in porosity ($πr^2$×n/$πR^2$), r represents a radius (mm) of the holes formed in the porous plate, n represents the number of holes formed in the porous plate, and R represents a radius (mm) of the porous plate.

2. The method of claim 1, wherein the water-soluble ethylene-based unsaturated monomer includes one or more selected from the group consisting of an anionic monomer including acrylic acid, methacrylic acid, maleic anhydride, fumaric acid, crotonic acid, itaconic acid, 2-acryloyl ethane sulfonic acid, 2-methacryloyl ethane sulfonic acid, 2-(meth)acryloyl propane sulfonic acid, or 2-(meth)acrylamide-2-methylpropane sulfonic acid, and a salt thereof; a nonionic hydrophilic monomer including (meth)acrylamide, N-substituted (meth)acrylate, 2-hydroxyethyl(meth)acrylate, 2-hydroxypropyl(meth)acrylate, methoxypolyethyleneglycol(meth)acrylate, or polyethyleneglycol(meth)acrylate; and an unsaturated monomer containing an amino group including (N,N)-dimethylaminoethyl(meth)acrylate or (N,N)-dimethylaminopropyl(meth)acrylamide, and a quaternary compound thereof.

3. The method of claim 1, wherein in Chemical Formula 1, $R^1$ is methane-1,1-diyl, propane-1,3-diyl, propane-1,2-diyl, propane-1,1-diyl, n-butane-1,4-diyl, n-butane-1,3-diyl, n-butane-1,2-diyl, n-butane-1,1-diyl, 2-methylpropane-1,3-diyl, 2-methylpropane-1,2-diyl, 2-methylpropane-1,1-diyl, 2-methylbutane-1,4-diyl, 2-methylbutane-2,4-diyl, 2-methylbutane-3,4-diyl, 2-methylbutane-4,4-diyl, 2-methylbutane-1,3-diyl, 2-methylbutane-1,2-diyl, 2-methylbutane-1,1-diyl, 2-methylbutane-2,3-diyl, 3-methylbutane-1,2-diyl, or 3-methylbutane-1,3-diyl.

4. The method of claim 1, wherein the internal crosslinking agent includes 10% by weight to 100% by weight of the compound of Chemical Formula 1.

5. The method of claim 4, wherein the internal crosslinking agent further includes one or more additional internal crosslinking agents selected from the group consisting of N,N'-methylenebisacrylamide, trimethylolpropane tri(meth)acrylate, ethylene glycol di(meth)acrylate, polyethylene glycol di(meth)acrylate, propylene glycol di(meth)acrylate, polypropylene glycol di(meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, pentaerythritol tetraacrylate, triallylamine, allyl (meth)acrylate, ethylene glycol diglycidyl ether, propylene glycol, glycerin, and ethylene carbonate.

6. The method of claim 1, wherein the internal crosslinking agent is used in an amount of 0.01 part by weight to 5 parts by weight with respect to 100 parts by weight of the water-soluble ethylene-based unsaturated monomer.

7. The method of claim 1, wherein the base polymer powder has a particle size of 150 μm to 850 μm after the size-sorting.

8. The method of claim 1, wherein the surface crosslinking agent includes one or more polyols selected from the group consisting of ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol, and glycerol; one or more alkylene carbonate-based compounds selected from the group consisting of ethylene carbonate and propylene carbonate; epoxy compounds including ethylene glycol diglycidyl ether; oxazoline compounds including oxazolidinone; polyamine compounds; mono-, di- or polyoxazolidinone compounds; or cyclic urea compounds.

9. The method of claim 8, wherein the surface crosslinking agent further includes one or more inorganic materials selected from the group consisting of silica, clay, alumina, silica-alumina composite, titania, zinc oxide and aluminum sulfate.

10. The method of preparing the superabsorbent polymer of claim 1, wherein the surface crosslinking agent is used in an amount of 0.01 part by weight to 3 parts by weight with respect to 100 parts by weight of the base polymer powder.

11. The method of claim 1, wherein the heat treatment of the surface crosslinking is carried out at a temperature of 80° C. to 200° C. for 20 minutes to 2 hours.

12. The method of claim 1, wherein the superabsorbent polymer has a centrifuge retention capacity (CRC) of 35 g/g to 50 g/g for a physiological saline solution having a content of 0.9% by weight of sodium chloride aqueous solution for 30 minutes.

13. The method of claim 5, wherein the superabsorbent polymer has an absorption rate of 35 sec to 70 sec, as measured by a vortex method.

* * * * *